United States Patent [19]

Farchmin

[11] Patent Number: 5,065,443

[45] Date of Patent: Nov. 12, 1991

[54] IMAGE PROCESSOR WITH ILLUMINATION VARIATION COMPENSATION

[75] Inventor: David W. Farchmin, Grafton, Wis.

[73] Assignee: Allen-Bradley Company, Inc., Milwaukee, Wis.

[21] Appl. No.: 445,207

[22] Filed: Dec. 4, 1989

[51] Int. Cl.$^5$ .............................................. G06K 9/36
[52] U.S. Cl. ...................................... 382/53; 382/50; 358/169; 358/466
[58] Field of Search ................... 382/50, 53; 358/446, 358/464, 466, 475, 169, 174

[56] References Cited

U.S. PATENT DOCUMENTS

| | | | |
|---|---|---|---|
| 3,670,100 | 6/1972 | Briggs et al. | 178/7.1 |
| 3,790,706 | 2/1974 | Gubala et al. | 358/169 |
| 3,881,054 | 4/1975 | Walla | 358/169 |
| 3,886,305 | 5/1975 | Yew et al. | 358/169 |
| 3,988,776 | 10/1976 | Shinozaki et al. | 358/41 |
| 4,000,366 | 12/1976 | Sirrine | 358/171 |
| 4,216,503 | 8/1980 | Wiggins | 358/446 |
| 4,231,065 | 10/1980 | Fitch et al. | 358/169 |
| 4,489,349 | 12/1984 | Okada | 358/168 |
| 4,605,851 | 8/1986 | Ometz | 250/223 |
| 4,606,635 | 8/1986 | Miyazawa | 356/240 |
| 4,660,082 | 4/1987 | Tomohisa et al. | 358/446 |
| 4,701,612 | 10/1987 | Sturgil | 250/223 |
| 4,799,106 | 1/1989 | Moore et al. | 358/174 |
| 4,855,830 | 8/1989 | Davis et al. | 358/168 |

FOREIGN PATENT DOCUMENTS

| | | | |
|---|---|---|---|
| 2716212 | 10/1978 | Fed. Rep. of Germany | |
| 144614 | 12/1978 | Japan | 358/168 |

Primary Examiner—Leo H. Boudreau
Assistant Examiner—David Fox
Attorney, Agent, or Firm—Quarles & Brady

[57] ABSTRACT

An image processor analyzes objects such as work pieces passing along an assembly line. The processor stores a reference ratio of exemplary signal levels from the object and its background. As subsequent images are processed, a signal level for the image background is detected and multiplied by the reference ration to derive a theoretical signal level for the object in the image. The theoretical signal level and the actual signal level for the object are compared to detect a predetermined relationship therebetween. When the predetermined relationship exists, the amplification of the image signal is adjusted to achieve a predetermined difference between the background and object signal levels. If the predetermined relationship does not exist, the amplification of the image signal is adjusted to achieve a predetermined difference between the background image signal level and the theoretical signal level for the object.

15 Claims, 5 Drawing Sheets

IMAGE PROCESSOR WITH ILLUMINATION VARIATION COMPENSATION

BACKGROUND OF THE INVENTION

The present invention relates to image signal processing systems for evaluating objects present in the image, and more particularly to such systems which compensate for variation in the image signal due to changes in the object's illumination.

As automated assembly equipment becomes more sophisticated, it is desirable to add the sense of vision to such devices. This would enable the equipment to locate the position of an object being manufactured, as well as to inspect the object for the presence of components or the proper location and size of specific features. To this end, various vision systems have been devised which to generate and analyze a one or two dimensional electrical image of the workpiece, which image conventionally is composed of a series of image elements.

A common image analysis technique distinguishes the workpiece from its background based on the relative brightness of portions of the image. The instantaneous image signal voltage varies with the brightness of the corresponding image elements. By processing only image elements which have a brightness above or below a set threshold level the object can be separated from the background. For example when the object is brighter than the threshold, a simple analysis technique counts image elements having a brightness above the threshold level with the sum representing the width or area of the object.

One problem associated with this technique is that changes in lighting intensity alter the relative image element brightness. For example, as the source of artificial illumination ages, its light output changes. In addition, natural and artificial illumination levels may vary throughout the day. A change in illumination is translated into a change in the brightness of the image and the relationship between the object and background brightness levels and the threshold employed to distinguish between these image regions.

To overcome this problem, compensation systems have been used to measure the change in the image signal and adjust the threshold proportionally. An example of such a system is disclosed in U.S. Pat. No. 4,855,830. In other systems the camera iris and amplifier gain are varied to maintain the brightest and darkest image elements at relatively constant signal levels.

One advantage of machine vision systems is the ability to inspect an object moving rapidly along an assembly line. In such an application, the image sensor may continuously acquire images even when an object is not present in its field of view. When an object is not present in the image, conventional lighting compensation techniques may attempt to adjust the iris and gain of the sensor to place the brightest and darkest image elements at the defined levels, as if an object was present. Thereafter, when an object enters the sensor's field of view, the sensor signal became saturated and several iterations of the compensation technique were required to properly adjust signal levels to analyze the object. The process takes time and requires that the assembly line run at a slower speed to accommodate the vision system. Therefore, it is desirable to provide a lighting compensation technique which will recognize when an object is not present and not overcompensate.

SUMMARY OF THE INVENTION

An image processor includes a mechanism which compensates for variations in the illumination of an image. The processor receives an electrical image signal representing the image which includes an object positioned against a background. The compensation mechanism includes a means for storing data indicative of the relationship between reference image signal levels for the object and the background. For example, in a machine vision system, a sample image may be processed using exemplary lighting conditions to establish reference levels for the object and its background. The ratio of these two reference levels may be derived and stored in a memory within the processor.

During subsequent image processing, the actual image signal levels for the object and its background are detected. An arithmetic unit is provided for calculating a theoretical signal level from the detected image signal level for the background and the reference signal ratio. The image signal level for the object is compared to the theoretical image signal level in order to produce a signal indicative of the relationship of the two signals. A preprocessor circuit for the image signal is adjusted to vary the amplitude of the image signal based on one of two criteria depending upon whether a predetermined relationship exists between the image signal level for the object and the theoretical image signal. When the predetermined relationship exists, the amplitude of the image signal is adjusted until the difference between the signal level for the background and the signal level for the object corresponds to a predefined value. For example, this predefined value may be the difference between the reference signal levels for the object in the background in the sample image. When the predetermined signal level relationship does not exist, the amplitude of the image signal is adjusted until the difference the image signal level of the background and the theoretical image signal level for the object equals a predefined value.

Additional circuitry may be provided to offset the image signal by a given amount so that the image signal will lie within a predefined portion of the dynamic signal range of the processor. The amount of offset provided is determined by the relationship between the detected signal levels for the background and the object and a defined referenced level of the full dynamic range of the processor.

The principal object of the present invention is to provide compensation for variation in an image signal due to temporal changes in the intensity of illumination of the scene being imaged.

Another object of the present invention is to provide a reference ratio of the image signal levels for the object and the background and employ that reference ratio to determined whether subsequent image signals must be adjusted to compensate for the effects of illumination variation.

DETAILED DESCRIPTION OF THE INVENTION

Figure 1:
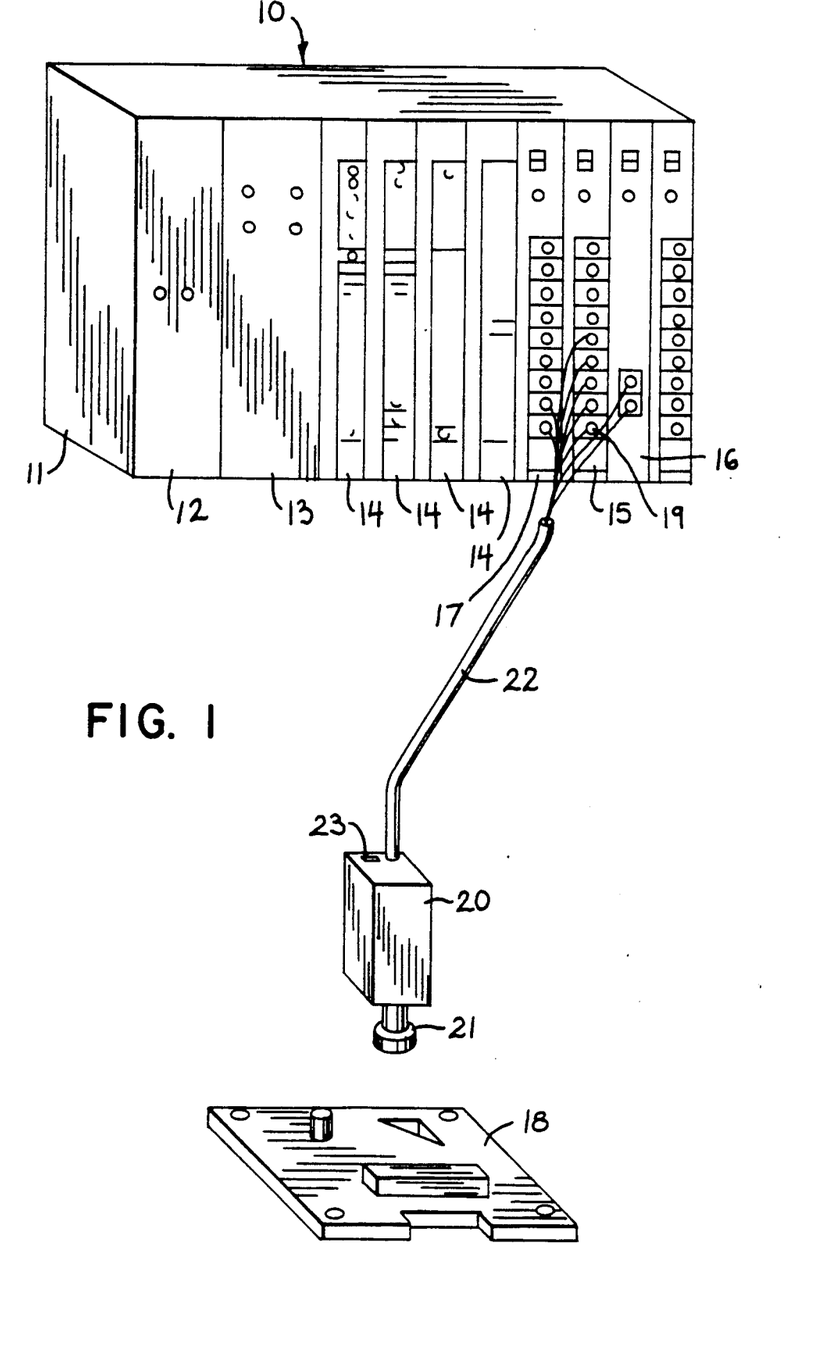
FIG. 1 is a pictorial representation of a programmable controller system with an image processor which incorporates the present invention.

FIG. 1 illustrates a conventional programmable controller 10, such as an Allen-Bradley PLC-2/15 System, which executes program instructions to operate a machine. The controller 10 includes a rack 11 in which a number of functional modules 13–16 are housed and interconnected by a mother board within the rack. The rack 11 includes a power supply 12 which provides electricity to each of the functional modules. A processor module 13 stores and executes a user defined control program governing the operation of the machine. Located elsewhere in the rack 11 are a number of input/output (I/O) modules 14–16 which interface the processor module 13 to sensing and operating devices on the controlled machine. One of these is a conventional discrete dc input module 15 has eight input terminals 19 to which separate dc voltages are applied. Typically, each of these dc voltages represents the state of a sensor switch that responds to a given condition of the controlled machine. An analog input module 16 receives data from a sensing device in the form of an analog current signal between four and twenty milliamperes. This input module 16 digitizes the analog signal for transmission to the processor module 13. A dc output module 17 is included to provide binary output signals for controlling external devices.

In the system shown in FIG. 1, the input terminals of both the analog input module 15 and the dc input module 16 are coupled to the outputs from a line scan image processor 20. The image processor 20 is positioned above an object 18 so that features of the object are focused by lens 21 onto a line scan sensor within the image processor. Both the object 18 and its background are illuminated by the same source so that a change in the intensity of the source affects the illumination of both to the same degree.

The line scan sensor produces a one-dimensional image along a line across each object 18 that enters its field of view. This image consists of a number of image elements which correspond to image detector sites within the sensor. The output signal of the sensor is an electrical concatenation of the signals from each of the detector sites which individual signals represent the amount of light striking that site.

The image processor 20 includes not only the line scan sensor, but also all of the logic for analyzing the linear image according to user defined parameters and circuitry generating output signals representing the analysis results. The image is analyzed by evaluating individual image elements. For example, the number image elements above a given brightness level can be counted to measure the width of the object or one of its features which is brighter than the remainder of the image.

The dc output module 17 enables the programmable controller 10 to send a trigger signal instructing the image processor 20 to acquire and analyze an image. The result of the analysis is fed to the programmable controller 10 via cable 22 in either of two formats. The first is a binary decision bit representing whether the evaluation product is within predefined limits. This decision bit is applied to an input of the dc input module 15. The image processor 20 also generates a 4 to 20 milliampere current signal corresponding to the magnitude of the selected evaluation result. This current signal is applied to the analog input module 16.

Figure 2:
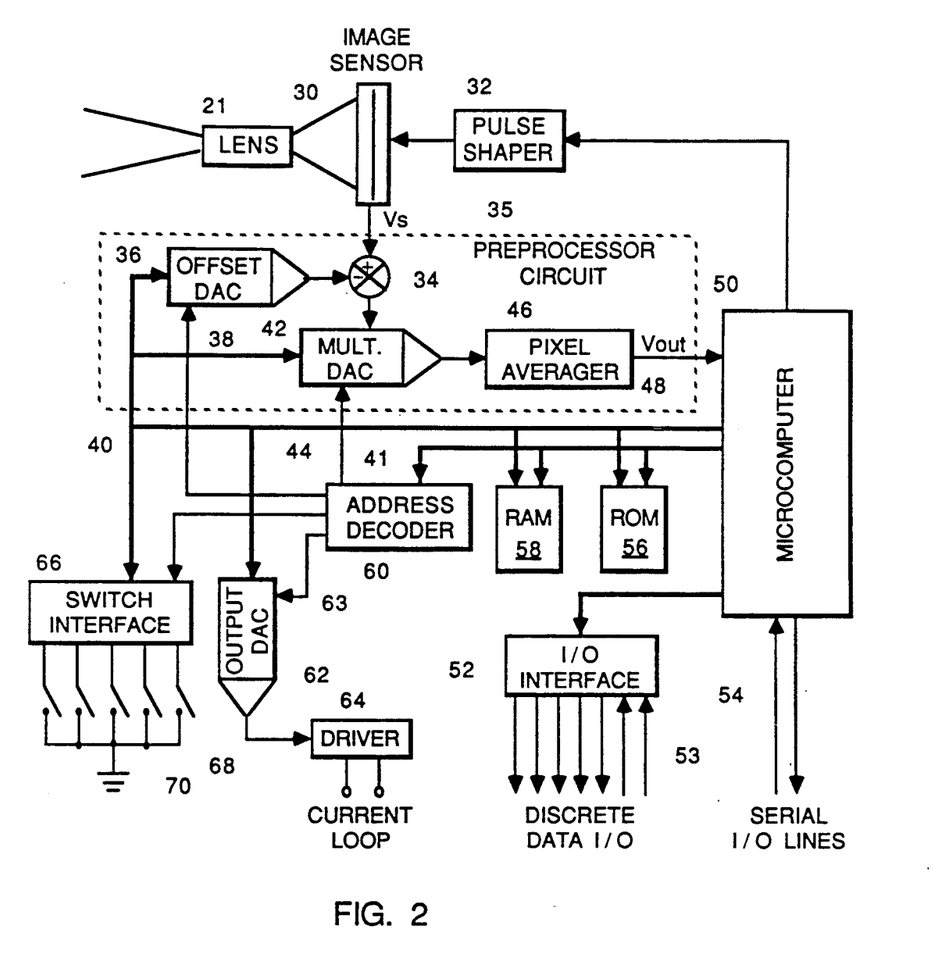
FIG. 2 is a schematic block diagram of the electrical circuit for the image processor.

With reference to FIG. 2, the lens 21 of the image processor 20 focuses the light onto a line scan image sensor 30. For example, the sensor is a linear array of 1,024 image detector sites and produces an image signal having an equivalent number of image elements. The voltage level Vs of the output signal from the sensor varies depending upon the brightness of the image element being read from the sensor at that instant. The image acquisition and readout of the sensor 30 is governed by control pulses applied by a pulse shaper circuit 32.

The output signal from the image sensor is coupled to a non-inverting input of a summing amplifier 34 which has an inverting input coupled to the output of an offset digital-to-analog converter (DAC) 36. The offset DAC 36 has a digital input coupled to a data bus 40 within the image processor and contains a data latch for storing the digital number on the bus in response to a control signal received over line 38. The offset DAC 36 produces an analog signal which is applied to the summing amplifier 34 to shift the voltage level of the sensor output signal. Typical image sensors provide a bias to their output signal so that the signal never falls to zero volts. In order to use the maximum dynamic signal voltage range of the image processor, the offset DAC shifts the image signal so that the full dynamic range can be used to process the signal, as will be described in detail.

The offset image signal from the summing amplifier 34 is applied to the analog input of a conventional multiplying digital-to-analog converter (DAC) 42. The data bus 40 is connected a set of data latches within DAC 42 which the store the digital value from the data bus 40 when enabled by a signal over line 44. The multiplying DAC 42 acts as a variable gain amplifier for the image signal with its gain being determined by the digital value from the data bus 40. As will be described in detail, the gain of the signal is varied to compensate for changes in the illumination of the object and its background.

The output signal of the multiplying DAC 42 is applied to the input of a pixel averager 46 which integrates that output signal to produce a single picture element from the averaged signals for each group of four image elements. As used herein the term "image element" refers to the portion of the image sensed by each detector site in the image sensor 30 and the term "picture element" refers to the output of the pixel averager 46 produced by averaging four image elements. The pixel averager 46 reduces the amount of image data by a factor of one-fourth and generates a lower resolution image signal containing a reasonable amount of image data which can be analyzed in real time. If desirable, the data reduction factor may be user selectable.

The two digital-to-analog converters 36 and 42, summing amplifier 34 and the pixel averager 46 form a preprocessor circuit 35 for the image signal. The relationship of the image signal voltage (VOUT) at the output line 48 of the preprocessor circuit 35 to voltage (Vs) from the image sensor 30 is given by the equation:

$$\text{VOUT} = (\text{Vs} - \text{VOFFSET}) \cdot (\text{GDAC} \cdot \text{GAVE}) \tag{1}$$

where VOFFSET is the output voltage of the offset DAC 36, GDAC is the gain of the multiplying DAC 42, and GAVE is the signal gain from the pixel averager 46.

The output signal from the pixel averager is applied to an analog input of a microcomputer 50. The microcomputer 50, such as a type MC68HC11A1 manufactured by Motorola Inc., which includes on-chip memory, a timer circuit, a serial communication interface, an analog-to-digital (A/D) converter, parallel input/output ports, and an external bus interface. Line 48, carrying the preprocessed image signal, is applied to the input of the microcomputer's A/D converter. The external bus interface is coupled to the data bus 40 and an address bus 41 within the image processor. A line of one of the parallel I/O ports is coupled to the input of the pulse shaper 32 to provide control pulses to the sensor 20 which regulate the image acquisition and readout functions. Other lines of the parallel I/O ports are connected to an I/O interface circuit 52 which provide discrete output signal indicating the results of the image processing which are coupled by cable 22 to the dc input module 15.

A pair of lines 54 extend from the microcomputer's serial communication interface to a connector 23 on the housing of the image processor 20, shown in FIG. 1. This provides a serial communication link in order that a terminal can be coupled to the processor 20 for configuration purposes.

The data and address buses 40 and 41, respectively, are coupled to a read only memory (ROM) 56 which stores the software program that the microcomputer executes to control the operation of the image processor. A random access memory (RAM) 58 also is coupled to the address and data buses 40 and 41 for the storage of image data, variables and processing results for the microcomputer 50. The address bus 41 is coupled to the input of an address decoder 60 which responds to selected addresses by producing control signals for specific components within the image processor 20. For example, the address decoder 60 responds to two addresses by issuing enable signals over lines 38 and 44 to the offset DAC 36 and the multiplying DAC 42 to individually enable the data latches in each device.

Coupled to the data bus is an output digital-to-analog converter (DAC) 62, which when enabled by a signal on line 63 from the address decoder stores the digital value from the data bus in a set of internal data latches. The output DAC 62 produces an analog signal at its output having a magnitude which corresponds to that stored digital value. A current driver 64 utilizes the analog signal from the output DAC 62 to produce a conventional four to twenty milliampere current loop output signal that represents the magnitude of an image analysis result. The current loop signal is carried on conductors of cable 22 to the analog input module 16 of the programmable controller 10.

Also coupled to the data bus 40 is a switch interface 66 which consists of a plurality of tri-state data buffers, which when enabled from the address decoder 60 couple a set of module configuration switches 68 to the data bus. The switch interface 66 includes a set of pull-up resistors for each of the switch input lines to the interface. The configuration switches 68, as will be described, provide the user with a means for selecting different processing options and placing the image processor in different modes of operation. One of the switches 70 is used to place the image processor 20 in a setup mode or a run mode.

The different modes of the image processor operation will be described in the context of an image in which the object is relatively dark in contrast to a brighter background. However, as will become apparent to one skilled in the art, the present invention can be adapted to process images in which the object is brighter than the background. In fact, one of the switches 68 in the preferred embodiment enables the user to designate whether the object is brighter or darker than its background. This designation is used by the microcomputer 50 to determine how to perform the steps of the illumination compensation process described hereinafter. Regardless of whether the object is lighter or darker than the background, a significant degree of contrast must exist between the two for the proper illumination compensation, as well as image analysis.

Figure 3A:
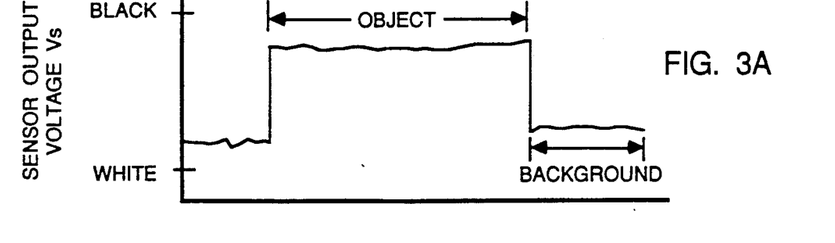
FIGS. 3A-3E depict the image signal at different points in the circuit of FIG. 2 and the signals for different images.

In the exemplary case used to describe the present invention, the voltage waveform of the one-dimensional image produced by the line scan image sensor 30 is represented by the waveform in FIG. 3A. The magnitude of the image sensor's output voltage Vs is inversely proportional to the brightness of the image elements. That is, a pure white portion of the image will have a relatively low voltage and a relatively black portion will have a higher voltage as shown in the waveform. Since in the example the object is relatively dark, it will have a high voltage and the background will have a relatively low voltage, as depicted in the waveform. Typically, the background will not be pure white and the object will not be pure black, thereby producing image voltages which are offset slightly from the corresponding extreme signal levels. The image sensor 30 also provides an inherent bias in its output voltage such that a pure white portion of the image does not produce a zero voltage level, but produces one that is slightly higher than zero, as illustrated. However, when this signal is combined with the output from the offset DAC 36 in summing circuit 34, the waveform in FIG. 3A will be shifted such that a pure white level will be represented by zero volts.

Figure 3B:
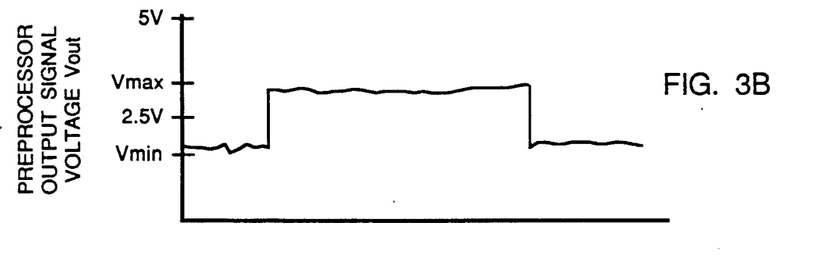
Figure 3C:
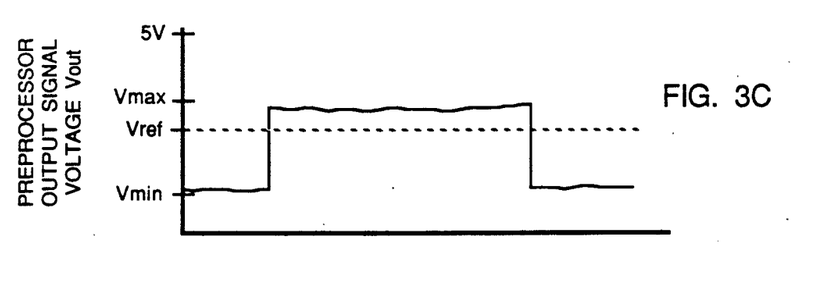
Figure 3D:
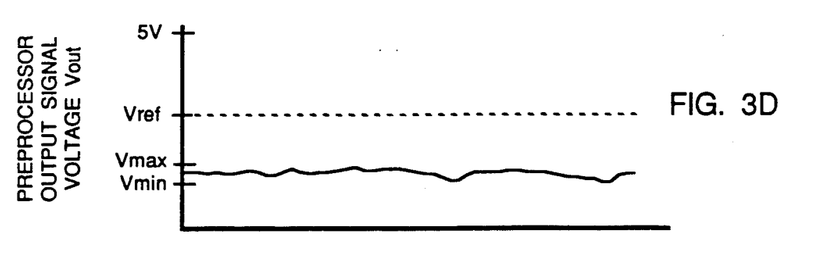

FIG. 3B illustrates the image signal waveform on output line 48 of the preprocessor circuit 35. The dynamic range of the analog input of the microcomputer 50 is zero to five volts, which defines maximum allowable range of the preprocessor output signal voltage VOUT. When the preprocessor circuit 35 is properly adjusted, its output image signal waveform occupies the central one-third of the circuit's dynamic range. The present invention periodically adjusts the preprocessor circuit 35 and the image sensor operation to maintain this relationship between the image signal voltage range and the microcomputer's dynamic signal voltage range as the illumination of the object changes. Specifically, the image sensor exposure time, the output voltage from the offset DAC 36, and the gain of the multiplying DAC 42 are adjusted so that the voltage range of the preprocessor circuit output signal is substantially within the middle third of the microcomputer's dynamic signal voltage range.

In order to provide this compensation, the image processor 20 must be configured for the voltage waveform produced by the image to be analyzed. For the configuration process, a sample of the objects to be inspected is placed in front of the processor and illuminated. The operator then places the mode switch 70 into the setup mode position indicating to the microcomputer 50 that it is to configure the preprocessor circuit 35 for the voltage waveform for the sample image.

Figure 4:
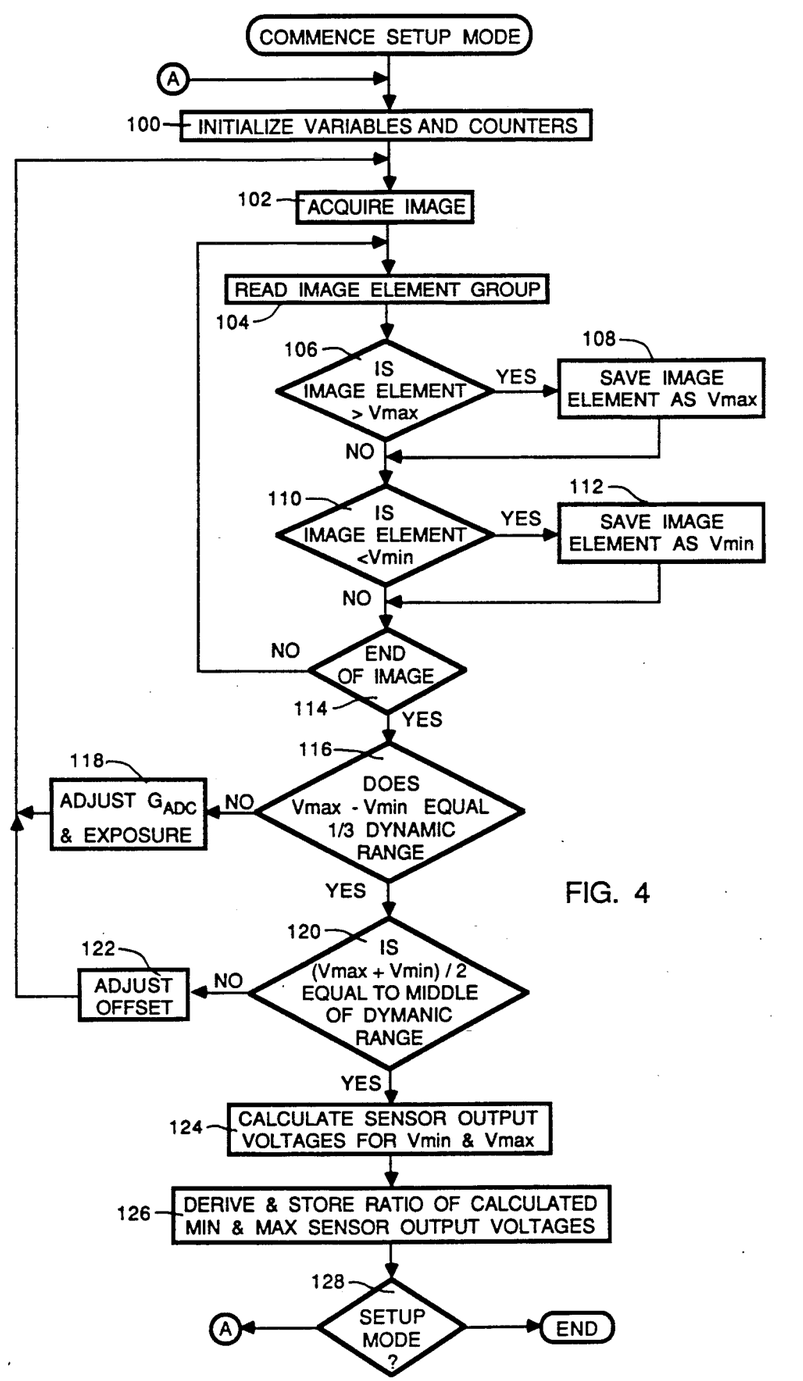
FIG. 4 is a flowchart of the setup of the present illumination compensation mechanism.

At this time, the microcomputer 50 begins executing the setup mode routine depicted by the flowchart of FIG. 4. The routine commences at step 100 by initializing the variables and counters which will be used in the course of executing the setup program. During this stage, default values are retrieved from storage in the read only memory 56 by the microcomputer 50 and loaded into the data buffers of DAC's 36 and 42.

Once the initialization is complete, the microcomputer 50 issues a control pulse to the pulse shaper 32 which causes the image sensor 30 to acquire an image at step 102. In this state, the individual detector sites of the image sensor have an electrical characteristic altered in response to the impining light. For example, if the image sensor 30 is a charge-coupled-device, the charge accumulated at each detector site will vary in proportion to the amount of light striking that site during the exposure interval. The length of the pulse sent by the microcomputer to the image sensor determines the time interval of the exposure. As will be described, this exposure interval is one variable which is regulated to compensate for variations in the object's illumination.

Once the image has been acquired, the program execution enters a loop in which each image element is read out of the sensor 30 and averaged to produce a picture element which then is examined to detect the minimum and maximum voltage levels of the image. As noted previously, the voltage level of an image element and a picture element corresponds to its brightness. The program loop commences at step 104, where the first group of four image elements is read out of the sensor 30 and applied to the positive input of summing circuit 34. At the same time, the offset DAC 36 is applying a constant voltage level to the negative input of the summing circuit 34. This voltage level is determined by a digital number previously loaded into the data buffers in the offset DAC 36. The level shifted image signal produced by the signal summation in circuit 34 is applied to the analog input of the multiplying DAC 42. In this DAC 42, the analog signal level is multiplied by a digital number stored in its data buffers to produce an amplified image signal which is applied to the input of the pixel averager 46.

Each group of four image elements is averaged by the pixel averager 46 to reduce the amount of image data applied to the input of the microcomputer 50. For example, the pixel averager 46 consists of an integrator which is reset to zero, after every fourth image element, by a clock signal (not shown) synchronized to the readout rate of the image sensor 30. Each group of four averaged image elements produces one picture element which is digitized and analyzed by the microcomputer 50.

The voltage level of the picture element received by the microcomputer 50 is compared at step 106 to a voltage level store in RAM 58 to determine if that element has maximum voltage level for the image. This comparison detects the level of the darkest picture element. If the present picture element has a voltage level that is greater than the previous voltage maximum, the program execution branches to step 108 where the voltage level for this picture element is stored in RAM 58 as the new maximum voltage level. The program execution then advances to step 110 where the voltage level of the picture element is compared to the minimum voltage level previously encountered for elements of the image. This minimum voltage level is also stored in RAM 58. If the present picture element has a voltage level below the previous minimum voltage level encountered for the image, the present element's voltage level is stored at step 112 as the minimum level In this manner the voltage level for the brightest picture element is detected.

After the picture element has been compared to the minimum and maximum voltage levels encountered for the image, a determination is made by the microcomputer 50 at step 114 whether the last picture element of the image has been so compared. If the end of the image has not been encountered, the program execution loops back to step 104 to read out another group of image elements for averaging and comparison to the previous minimum and maximum voltage levels. Eventually after the entire image has been processed by the loop consisting of program steps 104-114, the execution will advance to step 116. At this point, the designated storage locations in RAM 58 contain the minimum and maximum voltage levels Vmin and Vmax of the current image. The minimum and maximum voltage levels voltage levels respectively represent the brightest and darkest picture elements and the range of voltages produced by the image. Due to the manner in which the scene is illuminated, the brightest picture element is produced by the image background and the darkest picture element is produced by the object.

Then, the microcomputer 50 calculates the difference between the minimum and maximum voltage levels of the image to determine whether the difference equals one-third the dynamic signal voltage range of the microcomputer analog input. If this relationship does not exist, the program execution branches from step 116 to step 118 where the microcomputer 50 adjusts either or both of the gain of the multiplying DAC 42 and the sensor exposure interval. The combined adjustment of these parameters alters the image signal in proportion to the amount that the actual voltage range between the minimum and maximum image signal voltages (Vmin and Vmax) deviates from one-third the dynamic signal voltage range of the microcomputer. Therefore, if the actual voltage range is greater than this fraction of the dynamic signal voltage range, the exposure and/or gain level decreases to compress the image voltage range. Similarly, if the actual voltage range is less than this fraction of the dynamic signal voltage range, the exposure interval and gain are increased to expand the voltage range of the image signal. To carry this out, the microcomputer calculates a new value for the gain and transmits it via the data bus 40 to the buffers within the multiplying DAC 42. In a similar manner, the microcomputer 50 adjusts a variable within RAM 58 which indicates the exposure interval for the image sensor 30. Once these parameters have been adjusted at step 118 the program execution returns to step 102 to acquire a new image. The program execution continues to loop through its execution until the gain and exposure have been adjusted so that the difference in the brightest and darkest parts of the image substantially equal one-third of the dynamic signal voltage range of the microcomputer.

Once the voltage range of the image signal has been properly adjusted, the program execution advances to step 120 where the mean of this voltage range is compared to the mean of the microcomputer's dynamic signal voltage range. Specifically, the maximum and minimum voltage levels (Vmin and Vmax) of the image are averaged and the resultant value compared to 2.5 volts in the case where the dynamic signal range is zero to five volts. Any deviation of the mean of the image voltage range from the mean of the dynamic signal voltage range is used at step 122 to adjust the image signal voltage offset provided by the offset DAC 36. The microcomputer 50 computes a new voltage offset based on this deviation and digitally transmits the new offset over data bus 40 to the buffers within the offset DAC 36. When the preprocessor circuit 35 has been adjusted so that the image signal on it output line 48 occupies the middle third of the microcomputer's dynamic signal voltage range, the program execution advances to step 124.

At this point, the preprocessor circuit 35 has been calibrated for the sample image containing an object to be analyzed. Next the ratio of the reference brightness levels for the sample object and its background is derived and stored in the RAM 58 to use as a benchmark to detect later variation in the illumination of the objects being inspected. The output voltage Vs from the sensor is directly related to the image brightness. However the microcomputer 50 does not receive this output voltage Vs, rather it receives a voltage level Vout produced by preprocessor circuit 35 transforming the sensor output voltage Vs. Since the signal transformation is defined by equation (1) above, relative brightness levels of the object and image background can be derived by solving the equation for the equivalent image sensor output voltages Vs using the minimum and maximum picture element voltage levels (Vmin and Vmax) as voltage Vout. At step 124 the equation is solved to produce the equivalent image sensor output voltages Vs for VMIN and VMAX, thereby generating a pair of numerical values which directly correspond to the relative brightness levels of the image background and object, respectively. The ratio of these two equivalent sensor output voltages is derived at step 126 and stored within RAM 56. As will be described, this ratio will be retrieved during the run mode of the illumination compensation technique when an image is being evaluated. Alternatively, the values for VMIN and VMAX or their equivalent image sensor output voltages can be stored at this time and the calculations performed at steps 124 and 126 can be deferred until the voltage ratio is required subsequently. However calculating these values in the set up mode has the advantage of speeding up the execution of the compensation routine in the run mode.

Thereafter, at step 128, the microcomputer checks the mode switch 70 to determine if the operator wishes to leave the setup mode. As long as the switch remains in the setup mode, the program execution returns to step 100 to repeat the preprocessor adjustment and brightness ratio calculation process.

When the mode switch 70 has been changed into the run mode, the microcomputer 50 begins executing an image analysis program which includes a routine for readjusting the signal processing to compensate for variations in the illumination of the objects being imaged. With reference to FIG. 2, whenever the image processor 20 receives a trigger signal on input line 53 to the I/O interface 52, it begins an acquisition and analysis of an image. The microcomputer 50 responds the trigger signal by sending a control pulse to the image sensor 30 which causes the sensor to acquire an image. The signal from each sensor detector site is sequentially read out through the preprocessor 35 to produce a series of picture elements at the analog input to the microcomputer 50. As each of these picture elements is received, the microcomputer 50 is executing a conventional image analysis program. For example, the program may compare the voltage level each picture element to a threshold and count the picture elements having a voltage level above the threshold.

Figure 5:
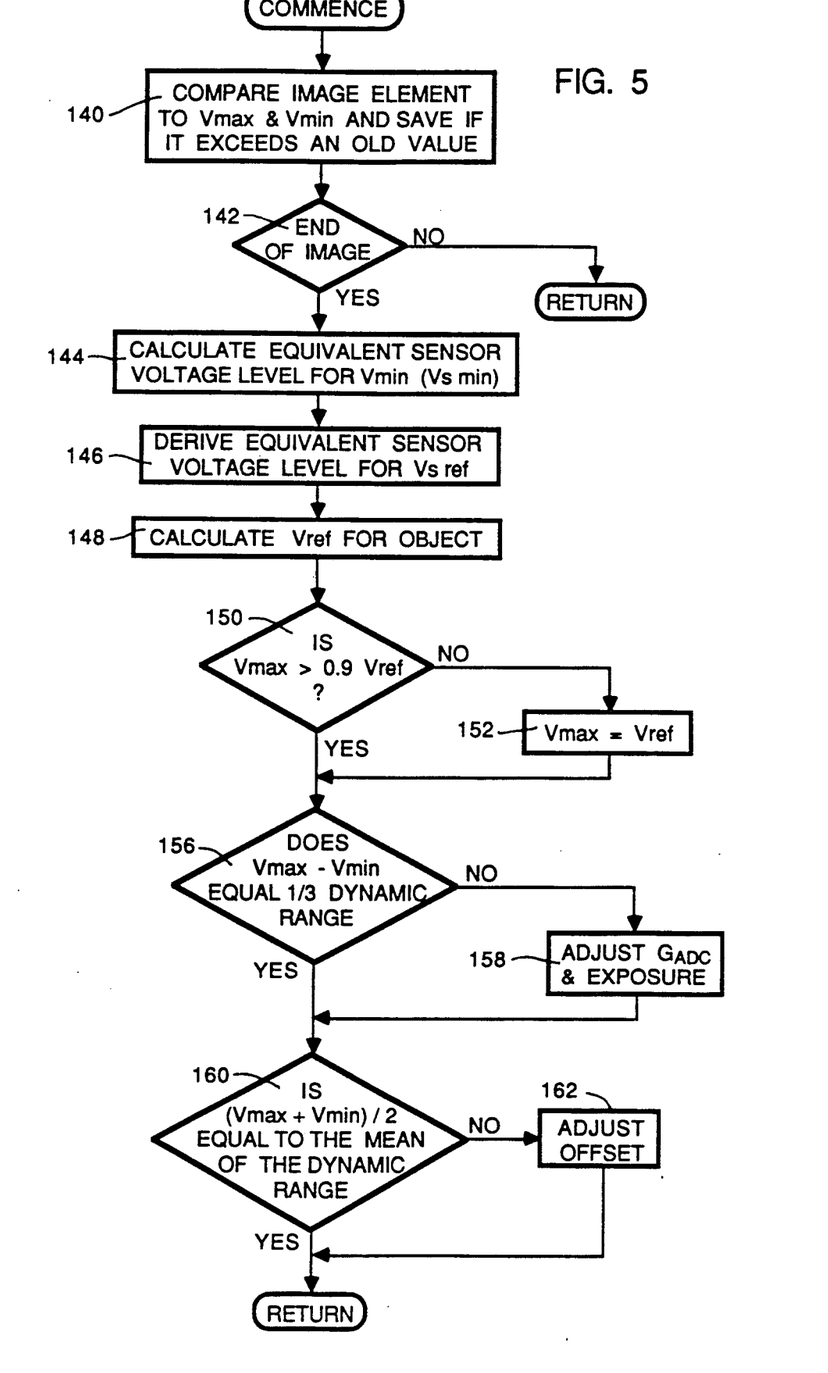
FIG. 5 is a flowchart of the operation illumination compensation mechanism.

As each picture element is being evaluated by the image analysis routine of the microcomputer, it is also being processed by the illumination compensation routine depicted in FIG. 5. At step 140 of this latter routine, the voltage level of the picture element currently being processed is compared to the minimum and maximum voltage levels from previous picture elements in the same image to determine whether it is above the previous maximum or below the previous minimum voltage level. The comparison may be carried out by a set of program steps similar to steps 106-112 of the setup mode routine in FIG. 4. If the current picture element voltage level exceeds one of the previous extreme values, it replaces the previous value in the RAM 58, thereby becoming the new maximum or minimum. At step 142, the microcomputer determines whether or not the last picture element of the image has been processed. As long as additional picture elements remain, the program execution immediately returns to the image analysis routine to process another picture element.

When all of the image elements from the sensor 30 have been read out, the execution of the illumination compensation routine advances to step 144. At this point, a voltage level corresponding to the image background is obtained. In the example illustrated in FIG. 3, the background is brighter than the object, producing picture elements representing the background which have a lower voltage level than those produced by the object. As a consequence, the minimum voltage Vmin for the image is associated with the background. The microcomputer 50 utilizes equation (1) above to calculate the equivalent sensor output voltage Vs MIN for the minimum picture element voltage Vmin. Alternatively, if the object is brighter than the background, the maximum voltage Vmax of the image is used as the level representing the background and the microcomputer calculates Vs MAX.

From the equivalent minimum sensor voltage Vs min and the ratio of maximum and minimum sensor voltages stored during the setup mode, a theoretical sensor voltage level VS REF for the maximum voltage level of the image is calculated at step 146. This theoretical voltage level VS REF ideally corresponds to the darkest part of the image for the object. Next, the microcomputer again utilizes equation (1) to convert the theoretical sensor voltage level VS REF of the object into the equivalent preprocessor circuit output voltage level VREF, at step 148.

The theoretical preprocessor circuit output voltage level VREF is compared to the actual maximum voltage level VMAX from the present image's darkest picture element. When the object is properly lit, the darkest picture element should be produced by a portion of the object. If an object is present in the image, as depicted in the voltage waveform in FIG. 3C, the level of VMAX will approximately equal the theoretical voltage level VREF. Therefore, if VMAX is not greater than ninety percent of the theoretical voltage level VREF for the object, the microcomputer concludes that an object is not present in the image and only background is being image. Even when an object is present, if it does not produce a maximum voltage level VMAX above ninety percent of VREF, the system still concludes that an object is not present. It should be noted that the image waveform in FIG. 3C does not lie in the middle of the dynamic signal range and the maximum voltage level is greater than the theoretical maximum, as may occur when the intensity of the object's lighting changes.

Figure 3E:
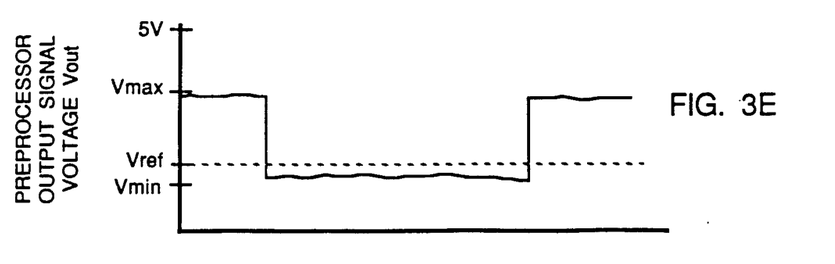

As discussed above, the image processor 20 can be configured for an image in which the background is darker than the object. In this case as shown in FIG. 3E, the image signal at the output of the preprocessor circuit 35 will have a voltage waveform that is inverted as compared to the one in FIG. 3C. Since the object's picture elements are represented by lower voltage levels than the background picture elements, the logic employed to determine if an object is present must be inverted. That is in order to conclude that an object is present, the actual minimum image signal voltage Vmin (associated with the object) must be less than 110 percent of the theoretical voltage level VREF for the object.

The voltage levels used by the illumination compensation technique depend upon the conclusion as to whether an object is present. Returning to the example in FIG. 3C in which the background is brighter than the object, if it is concluded that an object is present the measured maximum voltage level VMAX for the image is used as the brightest image level, otherwise the theoretical voltage level VREF for the object is used. At step 150 in FIG. 5, if the value of VMAX does not exceed ninety percent of the theoretical voltage level VREF, the system concludes that an object is not present in the image. In this case, the program branches to step 152 where the value of VMAX is replaced by the value of the theoretical voltage level VREF. Therefore, during the remainder of the illumination compensation routine, the theoretical voltage level will be used in place of the actual voltage level of the darkest picture element of the object. However, if the value of VMAX previously determined from inspecting the picture elements, exceeds ninety percent of the theoretical value for the object's voltage, the actual value is used in the remainder of the compensation technique.

Once the value for VMAX has been chosen, the program advances to step 156 where the difference between the actual value of VMIN and a chosen value for VMAX is determined and compared to a level equal to one-third the dynamic signal voltage range of the microcomputer 50. When a substantial change in illumination of the object occurs, the difference between the levels of VMAX and VMIN will differ significantly from one-third of the microcomputer's dynamic signal voltage range. If this is the case, the program branches to step 158 where the gain GADC of the multiplying DAC 42 and the exposure time are adjusted in proportion to the amount of deviation. Several interactions of the gain and exposure time alteration process may be required before the difference between VMAX and VMIN substantially equals one-third of the dynamic signal voltage range.

At step 160, the mean between the VMAX and VMIN is calculated and compared to the mean of the dynamic signal voltage range of the microcomputer. If the calculated mean does not substantially coincide with the mean of the dynamic signal voltage range, the program branches to step 162 where the output of the offset DAC 36 is adjusted to bring the two means into coincidence. Thus, steps 56-62 provide an adjustment of the signal applied to the analog input of the microcomputer 50 to compensate for variations in the image signal due to changes in the light intensity striking the object.

I claim:

1. A system which compensates for the effects, caused by illumination variation, to a image signal representing an image of an object positioned against a background, and which comprises:
    means for storing data indicating the relationship of reference image signal levels for the object and the background;
    means for detecting an image signal level for the background of the image;
    means for detecting an image signal level for the object in the image;
    means for calculating a theoretical image signal level for the object from the stored data and the detected image signal level for the background;
    means for comparing the image signal level for the object to the theoretical image signal level;
    means for adjusting the amplitude of the image signal (1) until the difference between the signal level for the background and the image signal level for the object equals a predefined value, when the image signal level for the object has a predetermined relationship to the theoretical image signal level, or (2) until the difference between the image signal level of the background and the theoretical image signal level for the object equals a predefined value, when the image signal level for the object does not have the predetermined relationship to the theoretical image signal level.

2. The system as recited in claim 1 wherein the data indicating the relationship of reference image signal levels for the object and the background stored in the means for storing is the ratio of the two reference image signal levels.

3. The system as recited in claim 1 wherein a common predefined value is employed by said means for adjusting the amplitude of the image signal, which value is substantially equal to the difference between the reference image signal levels for the object and the background.

4. The system as recited in claim 1 wherein the predetermined relationship of said means for adjusting the amplitude of the image signal is satisfied when the image signal level for the object is greater than the theoretical image signal level.

5. The system as recited in claim 1 wherein the predetermined relationship of said means for adjusting the amplitude of the image signal is satisfied:
    (a) when the image signal level for the object is greater than both the image signal level for the background and the theoretical image signal level; or
    (b) when the image signal level for the object is less than both the image signal level for the background and the theoretical image signal level.

6. An processor which analyzes images containing an object positioned against a background and which comprises:
    an image sensor for producing an image signal representing an image;
    a preprocessor for amplifying the image signal;
    means coupled to said preprocessor for analyzing the portions of the image signal representative of the object;

means for storing a ratio of the image signal levels for the object and the background of a reference image;

means for detecting an image signal level for the background of the image;

means for detecting an image signal level for the object in the image;

means for calculating a theoretical image signal level for the object from the stored ratio and the detected image signal level for the background;

means for comparing the image signal level for the object to the theoretical image signal level;

means for adjusting said preprocessor (1) until the difference between the signal level for the background and the image signal level for the object equals a predefined value, when the image signal level for the object has a predetermined relationship to the theoretical image signal level, or (2) until the difference between the image signal level of the background and the theoretical image signal level for the object equals the predefined value, when the image signal level for the object does not have the predetermined relationship to the theoretical image signal level.

7. The processor as recited in claim 6 wherein:

said preprocessor further includes a means for offsetting the image signal within a defined range of signal levels; and said means for adjusting said preprocessor further alters said means for offsetting so that the image signal is maintained at a substantially constant offset within the defined range of signal levels.

8. The processor as recited in claim 6 wherein the predefined value employed by said means for adjusting the preprocessor is substantially equal to the difference between the image signal levels for the object and the background of the reference image.

9. The processor as recited in claim 6 wherein the predetermined relationship of said means for adjusting the preprocessor is satisfied:

(a) when the image signal level for the object is greater than both the image signal level for the background and the theoretical image signal level; or (b) when the image signal level for the object is less than both the image signal level for the background and the theoretical image signal level.

10. A system which compensates for the effects, caused by illumination variation, to a image signal having first and second extreme levels, said system comprising:

means for storing data indicating a reference relationship for the first and a second extreme levels;

means for detecting the first extreme level of the image signal;

means for detecting the second extreme level of the image signal;

means for calculating a theoretical second extreme level of the image signal from the stored data and the detected first extreme level of the image signal;

means for comparing the second extreme level of the image signal to the theoretical second extreme level;

means for adjusting the amplitude of the image signal (1) until the difference between the first and second extreme levels of the image signal equals a predefined value, when the second extreme level of the image signal has a predetermined relationship to the theoretical second extreme level, or (2) until the difference between the first extreme level of the image signal and the theoretical second extreme level equals the predefined value, when the second extreme level does not have the predetermined relationship to the theoretical second extreme level.

11. The system as recited in claim 10 wherein the data indicating the reference relationship stored in the means for storing is the ratio of the first and a second extreme levels for a reference image signal.

12. The system as recited in claim 11 wherein the predefined value employed by said means for adjusting the amplitude of the image signal is substantially equal to the difference between the first and a second extreme levels for the reference image signal.

13. The system as recited in claim 10 wherein the predetermined relationship of said means for adjusting the amplitude of the image signal is satisfied (a) when the second extreme level of the image signal is greater than both the first extreme level of the image signal and the theoretical image signal level; or (b) when the second extreme level of the image signal is less than both the first extreme level of the image signal and the theoretical second extreme level.

14. A method of compensating for the effects, caused by illumination variation, to a image signal having first and second extreme levels, comprising the steps of:

establishing a ratio of reference values for the first and a second extreme levels;

detecting the first extreme level of the image signal;

detecting the second extreme level of the image signal;

calculating a theoretical second extreme level of the image signal from the ratio of reference values and the detected first extreme level of the image signal;

if the second extreme level of the image signal has a predetermined relationship to the theoretical second extreme level, adjusting the amplitude of the image signal until the difference between the first and second extreme levels of the image signal equals a predefined value; and if the second extreme level of the image signal does not have the predetermined relationship to the theoretical second extreme level, adjusting the amplitude of the image signal until the difference between the first extreme level of the image signal and the theoretical second extreme level equals a predefined value.

15. The system as recited in claim 14 further comprising the step of adding a predetermined voltage offset to the image signal so that a predefined signal level between the first and second extremes inclusive has a fixed relationship to a zero magnitude level.

* * * * *